United States Patent
Kayyoor et al.

(10) Patent No.: US 10,425,435 B1
(45) Date of Patent: Sep. 24, 2019

(54) SYSTEMS AND METHODS FOR DETECTING ANOMALOUS BEHAVIOR IN SHARED DATA REPOSITORIES

(71) Applicant: Symantec Corporation, Mountain View, CA (US)

(72) Inventors: Ashwin Kayyoor, Sunnyvale, CA (US); Sandeep Bhatkar, Sunnyvale, CA (US); Saurabh Shintre, Sunnyvale, CA (US)

(73) Assignee: Symantec Corporation, Mountian View, CA (US)

( * ) Notice: Subject to any disclaimer, the term of this patent is extended or adjusted under 35 U.S.C. 154(b) by 118 days.

(21) Appl. No.: 15/490,925

(22) Filed: Apr. 19, 2017

(51) Int. Cl.
*H04L 29/06* (2006.01)
*H04L 29/08* (2006.01)

(52) U.S. Cl.
CPC ........ *H04L 63/1425* (2013.01); *H04L 63/104* (2013.01); *H04L 63/08* (2013.01); *H04L 67/1097* (2013.01)

(58) Field of Classification Search
CPC ... H04L 63/1425; H04L 63/104; H04L 63/08; H04L 67/1097
See application file for complete search history.

(56) References Cited

U.S. PATENT DOCUMENTS

| | | | | |
|---|---|---|---|---|
| 8,789,174 | B1 * | 7/2014 | Gupta | G06F 21/552 709/223 |
| 9,166,997 | B1 * | 10/2015 | Guo | H04L 63/1433 |
| 9,356,939 | B1 * | 5/2016 | Gates | H04L 63/104 |
| 9,692,768 | B1 * | 6/2017 | Kayyoor | H04L 63/105 |
| 10,015,182 | B1 * | 7/2018 | Shintre | H04L 63/1425 |
| 2005/0065903 | A1 * | 3/2005 | Zhang | G06Q 30/06 |
| 2006/0271564 | A1 * | 11/2006 | Meng Muntz | G06Q 10/00 |
| 2008/0288587 | A1 * | 11/2008 | Bahrs | G06Q 10/00 709/204 |

(Continued)

OTHER PUBLICATIONS

Wang et al., "Graph Structure Based Anomalous Behavior Detection", ICCIC 2017, Atlantis Press, Advances in Computing Science Research vol. 74, pp. 543-550.*

(Continued)

*Primary Examiner* — Robert B Leung
*Assistant Examiner* — Thomas Ho
(74) *Attorney, Agent, or Firm* — FisherBroyles, LLP

(57) ABSTRACT

The disclosed computer-implemented method for detecting anomalous behavior in shared data repositories may include (i) identifying a shared data repository that comprises files, (ii) monitoring access to the files for a predetermined time period in order to determine which files are accessed by each user, (iii) creating a graph of the access to the files, wherein each vertex represents a user and each edge that connects two vertices represents that one or more files were accessed by both users represented by the two vertices, (iv) deriving, from the graph, a set of communities, wherein each community represents a set of users that collaborated on one or more files during the predetermined time period, and (v) determining that a collaboration pattern of a user does not match a collaboration pattern for the user's community observed during the predetermined time period. Various other methods, systems, and computer-readable media are also disclosed.

17 Claims, 9 Drawing Sheets

(56) References Cited

U.S. PATENT DOCUMENTS

| | | | |
|---|---|---|---|
| 2010/0063973 A1* | 3/2010 | Cao | G06F 17/30477 707/758 |
| 2012/0284381 A1* | 11/2012 | Chidlovskii | G06Q 10/10 709/223 |
| 2013/0151805 A1* | 6/2013 | Fontignie | G06F 3/0611 711/170 |
| 2015/0046233 A1* | 2/2015 | Srulowitz | G06Q 10/06398 705/7.42 |
| 2015/0120717 A1* | 4/2015 | Kim | G06F 17/30699 707/727 |
| 2016/0162837 A1* | 6/2016 | Muntes Mulero | G06Q 10/103 705/301 |
| 2017/0092143 A1* | 3/2017 | Brennan | G09B 7/00 |
| 2017/0155672 A1* | 6/2017 | Muthukrishnan | H04L 63/1425 |
| 2018/0075147 A1* | 3/2018 | Bagheri | G06Q 30/0269 |

OTHER PUBLICATIONS

Eberle et al, "Anomaly Detection in Data Represented as Graphs", Apr. 2007, IOS Press, Intelligent Data Analysis vol. 11, pp. 663-689.*

You Chen et al.; Detecting anomalous insiders in collaborative information systems (https://www.ncbi.nlm.nih.gov/pmc/articles/PMC3905623/); Jan. 17, 2012.

Community Structure https://en.wikipedia.org/wiki/Community_structure; retrieved Apr. 17, 2017.

Barracuda Cloud; https://www.barracuda.com/programs/cloud; retrieved Apr. 17, 2017.

Cipher Cloud; http://www.ciphercloud.com/; retrieved Apr. 17, 2017.

Blue Coat Systems, Inc; https://bto.bluecoat.com/; retrieved Apr. 17, 2017.

* cited by examiner

SYSTEMS AND METHODS FOR DETECTING ANOMALOUS BEHAVIOR IN SHARED DATA REPOSITORIES

BACKGROUND

When an individual is working on a project, they can store all of the relevant files on their own computing device or in a personal data repository. When an organization is carrying out a project that involves numerous individuals, it is significantly more practical to store files in a shared data repository that is accessible by a large number of users operating many different computing devices. However, just because an organization wishes files for a project or projects to be accessible to a large number of individuals doesn't mean that every user is expected to access every file in the normal course of operations. In some cases, individuals or groups trying to commit corporate espionage may attempt to view or copy files from an organization's shared data repository. It is important for organizations to have some means of identifying suspicious patterns of data access in a shared data repository that may indicate data prospecting for purposes of corporate espionage.

Unfortunately, traditional systems for shared data repositories may have no mechanisms in place to detect anomalous file access behavior. While some traditional systems for shared data repositories may track which files are accessed by each user, these systems may not organize the file access records in any way that would allow an analyst to easily identify anomalous behavior. The instant disclosure, therefore, identifies and addresses a need for systems and methods for detecting anomalous behavior in shared data repositories.

SUMMARY

As will be described in greater detail below, the instant disclosure describes various systems and methods for detecting anomalous behavior in shared data repositories.

In one example, a computer-implemented method for detecting anomalous behavior in shared data repositories may include (i) identifying a shared data repository that includes a group of files that are accessed by a group of users, (ii) monitoring access to the files in the shared data repository for a predetermined time period in order to determine, for each user within the users, which files within the files are accessed by the user during the predetermined time period, (iii) creating a graph of the access to the files in the shared data repository, where each vertex in the graph represents a user within the users and each edge in the graph that connects two vertices represents that one or more files in the files were accessed during the predetermined time period by both users represented by the two vertices, (iv) deriving, from the graph, a set of communities, where each community includes a cluster of connected vertices within the graph that represent a set of users that collaborated on one or more files within the files during the predetermined time period, and (v) determining that a user who belongs to a community within the set of communities has an anomalous collaboration pattern based on determining that a collaboration pattern of the user does not match a collaboration pattern for the community observed during the predetermined time period.

In some examples, the computer-implemented method may further include performing a security action involving the user in response to determining that the user has the anomalous collaboration pattern. In some examples, determining that the user who belongs to the community within the set of communities has the anomalous collaboration pattern may include determining that the user has accessed at least one file in common with users who collectively belong to an anomalous amount of communities within the set of communities that do not include the community.

Additionally or alternatively, determining that the user who belongs to the community within the set of communities has the anomalous collaboration pattern may include calculating a set of touched communities for the user in the graph, where each touched community within the set of touched community includes a vertex that shares an edge with a vertex that represents the user, calculating an additional set of touched communities for the user in a more recent graph, where the more recent graph represents access to the files during a new predetermined time period that is more recent than the predetermined time period, and dividing the cardinality of the intersection of the set of touched communities for the user in the graph and the additional set of touched communities for the user in the more recent graph by the cardinality of the union of the set of touched communities for the user in the graph and the additional set of touched communities for the user in the more recent graph. In some examples, determining that the user who belongs to the community within the set of communities has the anomalous collaboration pattern may include creating, from the graph, a subgraph of the collaboration pattern for the user and analyzing the subgraph of the collaboration pattern for the user.

In one embodiment, the computer-implemented method may further include monitoring access to the files in the shared data repository for a new predetermined time period that begins after the predetermined time period began and updating the graph of the access to the files in the shared data repository to reflect file access performed by users during the new predetermined time period. In one embodiment, the computer-implemented method may determine that the set of communities derived from the graph no longer accurately represent the current state of the updated graph and may derive, from the updated graph, a new set of communities, where each new community includes a cluster of connected vertices within the updated graph that represent a set of users that collaborated on one or more files within the files during the new predetermined time period.

In some examples, creating the graph of the access to the files in the shared data repository may include determining a set of windows of time during the predetermined time period, for each window of time in the set of windows of time, creating a subgraph of access to the files in the shared data repository during the window of time, and combining the subgraphs of access to the files in the shared data repository during each window of time into the graph of the access to the files in the shared data repository. In some examples, combining the subgraphs of access to the files in the shared data repository during each window of time into the graph may include determining that the subgraphs include sufficient file access data to meet a predetermined threshold for file access data required to create a graph of the access to the files in the shared data repository.

In one embodiment, a system for implementing the above-described method may include (i) an identification module, stored in memory, that identifies a shared data repository that includes a group of files that are accessed by a group of users, (ii) a monitoring module, stored in memory, that monitors access to the files in the shared data repository for a predetermined time period in order to determine, for each user within the users, which files within the files are accessed by the user during the predetermined time period, (iii) a creation module, stored in memory, that creates a graph of the access to the files in the shared data repository, where each vertex in the graph represents a user within the users and each edge in the graph that connects two vertices represents that one or more files in the files were accessed during the predetermined time period by both users represented by the two vertices, (iv) a deriving module, stored in memory, that derives, from the graph, a set of communities, where each community includes a cluster of connected vertices within the graph that represent a set of users that collaborated on one or more files within the files during the predetermined time period, (v) a determination module, stored in memory, that determines that a user who belongs to a community within the set of communities has an anomalous collaboration pattern based on determining that a collaboration pattern of the user does not match a collaboration pattern for the community observed during the predetermined time period, and (vi) at least one physical processor configured to execute the identification module, the monitoring module, the creation module, the deriving module, and the determination module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify a shared data repository that includes a group of files that are accessed by a group of users, (ii) monitor access to the files in the shared data repository for a predetermined time period in order to determine, for each user within the users, which files within the files are accessed by the user during the predetermined time period, (iii) create a graph of the access to the files in the shared data repository, where each vertex in the graph represents a user within the users and each edge in the graph that connects two vertices represents that one or more files in the files were accessed during the predetermined time period by both users represented by the two vertices, (iv) derive, from the graph, a set of communities, where each community includes a cluster of connected vertices within the graph that represent a set of users that collaborated on one or more files within the files during the predetermined time period, and (v) determine that a user who belongs to a community within the set of communities has an anomalous collaboration pattern based on determining that a collaboration pattern of the user does not match a collaboration pattern for the community observed during the predetermined time period.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
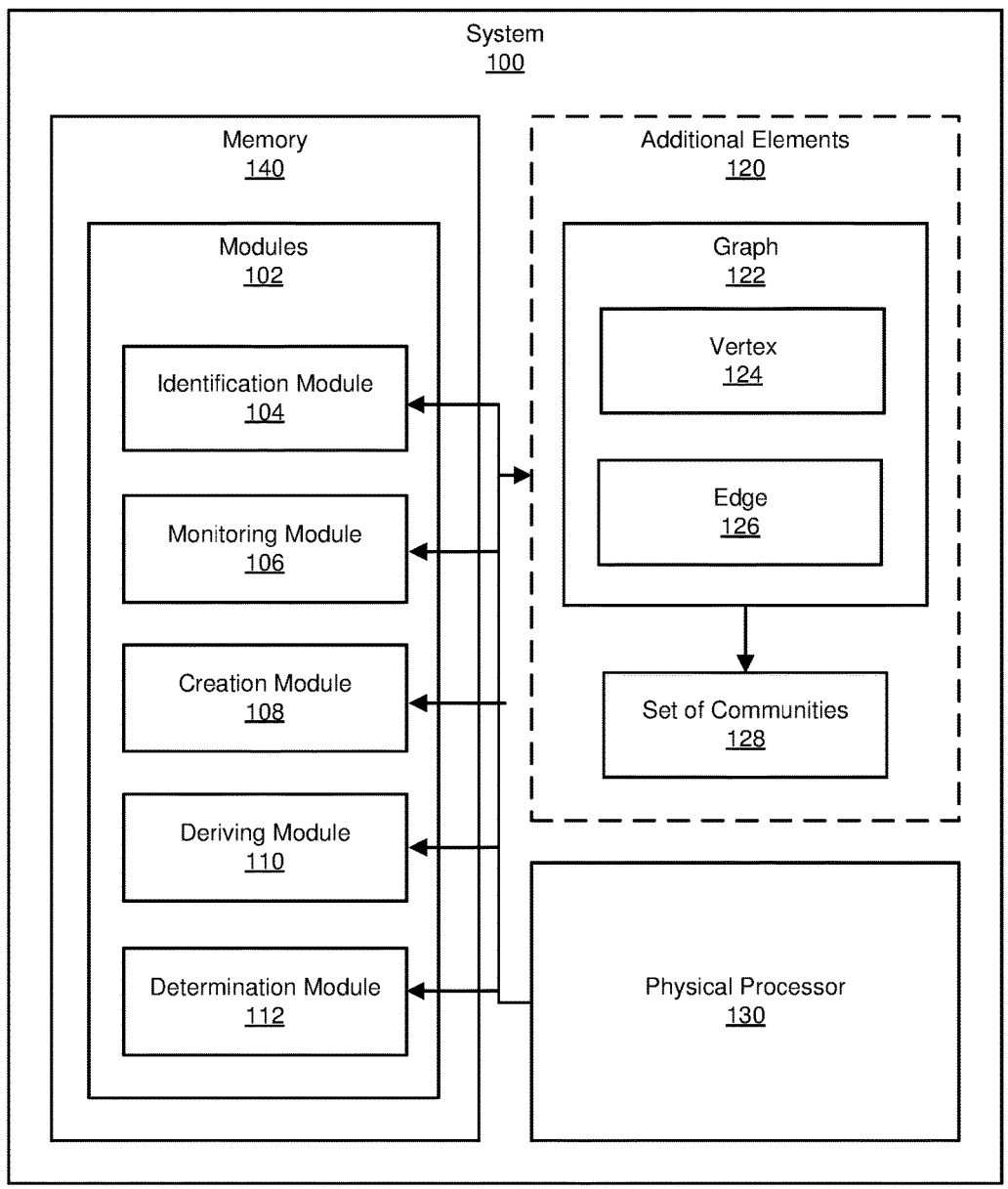
FIG. 1 is a block diagram of an example system for detecting anomalous behavior in shared data repositories.

Throughout the drawings, identical reference characters and descriptions indicate similar, but not necessarily identical, elements. While the example embodiments described herein are susceptible to various modifications and alternative forms, specific embodiments have been shown byway of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for detecting anomalous behavior in shared data repositories. As will be explained in greater detail below, by using clusters on a graph to represent groups of users collaborating on files, the systems and methods described herein may be able to detect anomalous file access behavior that may be indicative of file prospecting for corporate espionage. By detecting anomalous behavior in this way, the systems and methods described herein may be able to improve the security of an organization's data by enabling the organization to more efficiently identify users with suspicions patterns of file access and/or collaboration that do not match the pattern of a benign user accessing files for projects that the user is involved in. In addition, the systems and methods described herein may improve the functioning of a computing device by detecting potentially malicious access to a shared data repository stored on the computing device and/or another computing device with increased accuracy.

Figure 2:
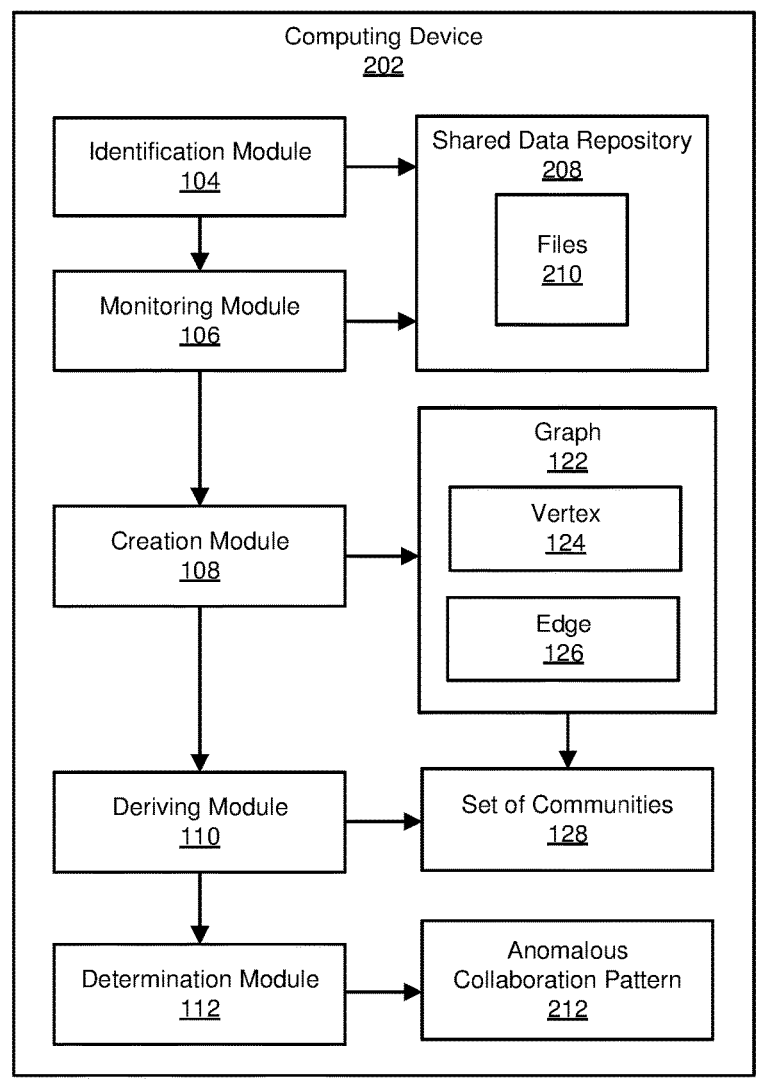
FIG. 2 is a block diagram of an additional example system for detecting anomalous behavior in shared data repositories.
Figure 6:
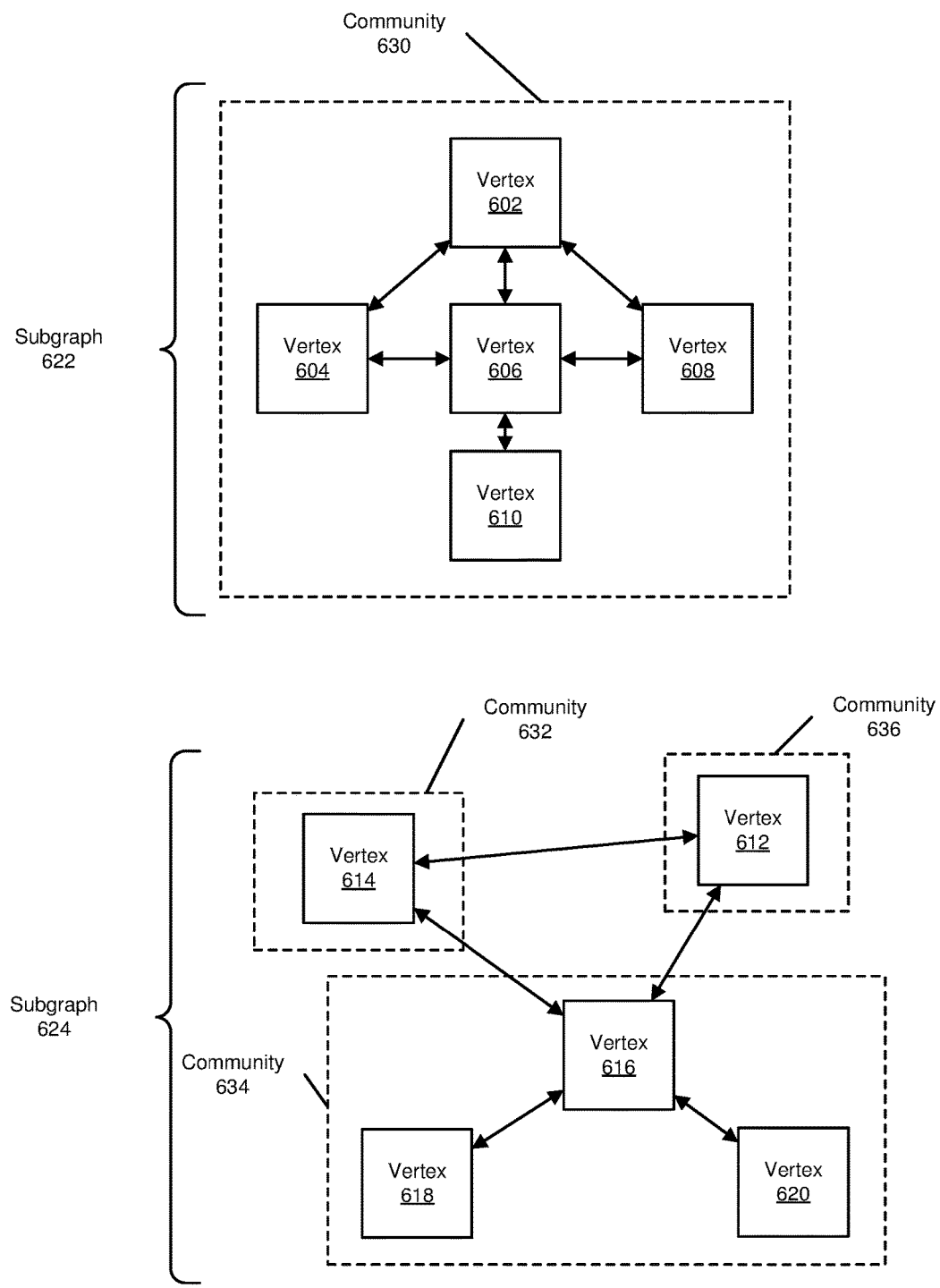
FIG. 6 is a block diagram of an example set of subgraphs.
Figure 7:
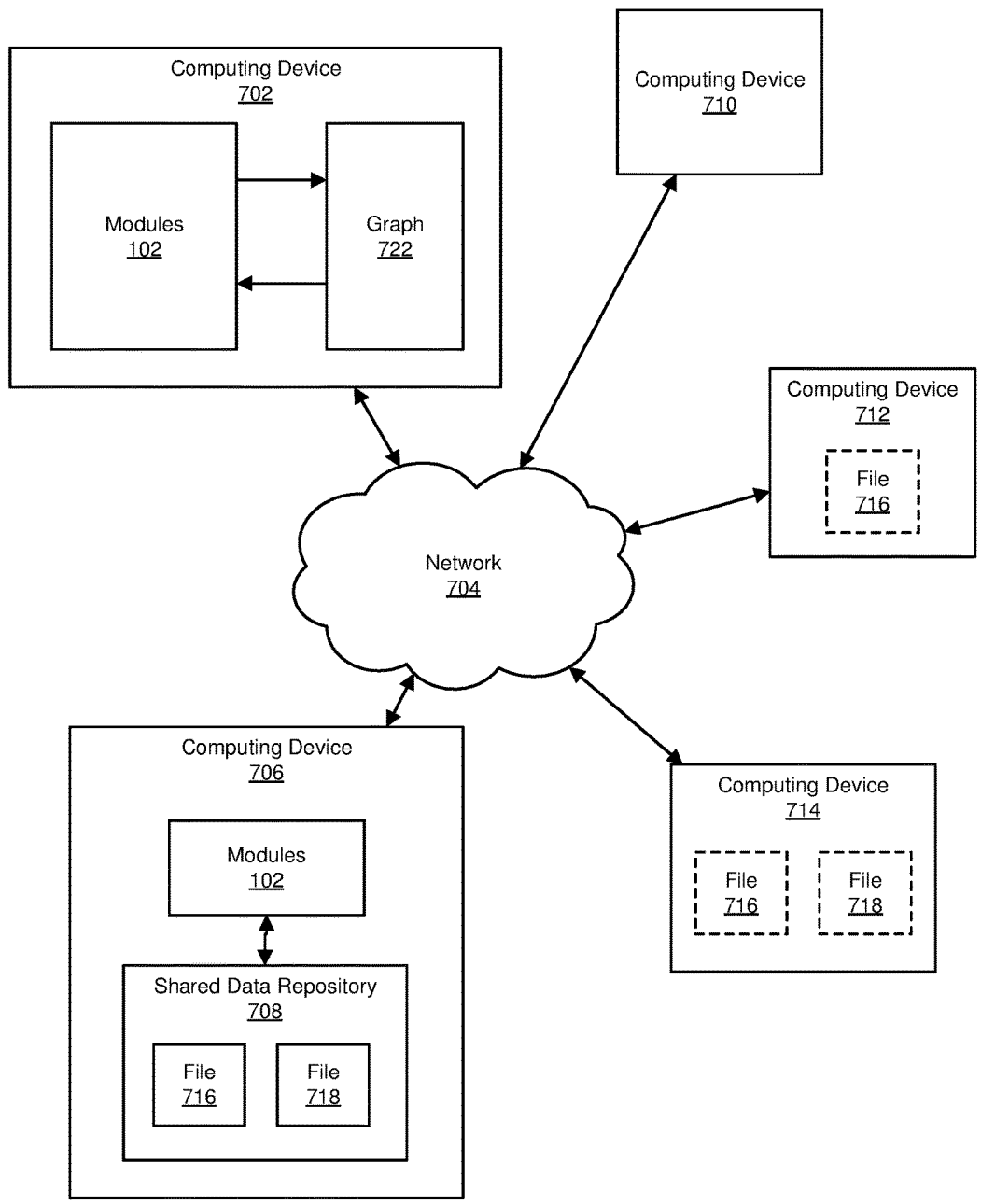
FIG. 7 is a block diagram of an additional example computing system for detecting anomalous behavior in shared data repositories.

The following will provide, with reference to FIGS. 1, 2, and 7, detailed descriptions of example systems for detecting anomalous behavior in shared data repositories. Detailed descriptions of corresponding computer-implemented methods will also be provided in connection with FIG. 3. Detailed descriptions of example graphs, communities, and/or subgraphs will be provided in connection with FIGS. 4, 5, and 6, respectively. In addition, detailed descriptions of an example computing system and network architecture capable of implementing one or more of the embodiments described herein will be provided in connection with FIGS. 8 and 9, respectively.

FIG. 1 is a block diagram of example system 100 for detecting anomalous behavior in shared data repositories. As illustrated in this figure, example system 100 may include one or more modules 102 for performing one or more tasks. For example, and as will be explained in greater detail below, example system 100 may include an identification module 104 that identifies a shared data repository that includes a plurality of files that are accessed by a plurality of users. Example system 100 may additionally include a monitoring module 106 that monitors access to the plurality of files in the shared data repository for a predetermined time period in order to determine, for each user within the plurality of users, which files within the plurality of files are accessed by the user during the predetermined time period. Example system 100 may also include a creation module 108 that creates a graph of the access to the plurality of files in the shared data repository, where each vertex in the graph represents a user within the plurality of users and each edge in the graph that connects two vertices represents that one or more files in the plurality of files were accessed during the predetermined time period by both users represented by the two vertices. Example system 100 may additionally include a deriving module 110 that derives, from the graph, a set of communities, where each community includes a cluster of connected vertices within the graph that represent a set of users that collaborated on one or more files within the plurality of files during the predetermined time period. Example system 100 may also include a determination module 112 that determines that a user who belongs to a community within the set of communities has an anomalous collaboration pattern based on determining that a collaboration pattern of the user does not match a collaboration pattern for the community observed during the predetermined time period. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as computing device 202 in FIG. 2. One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate detecting anomalous behavior in shared data repositories. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more graphs, such as graph 122. Graph 122 generally represents any data structure that includes vertices and edges, such as vertex 124 and/or edge 126. Example system 100 may also include set of communities 128, which generally represents any collection of data structures that each include one or more vertices.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to detect anomalous behavior in shared data repositories. For example, and as will be described in greater detail below, identification module 104 may identify a shared data repository 208 that contains a plurality of files 210 that are accessed by a plurality of users. Monitoring module 106 may monitor access to files 210 in shared data repository 208 for a predetermined time period in order to determine, for each user within the plurality of users, which files within files 210 are accessed by the user during the predetermined time period. At the end of the predetermined period of time, creation module 108 may create graph 122 of the access to files 210 in shared data repository 208, where each vertex in graph 122 (including, e.g., a vertex 124) represents a user within the plurality of users and each edge in graph 122 that connects two vertices (including, e.g., an edge 126) represents that one or more files in files 210 were accessed during the predetermined time period by both users represented by the two vertices. Next, deriving module 110 may derive, from graph 122, a set of communities 128, where each community includes a cluster of connected vertices within graph 122 that represent a set of users that collaborated on one or more files within files 210 during the predetermined time period. In some instances, determination module 112 may determine that a user who belongs to a community within set of communities 128 has an anomalous collaboration pattern 212 based on determining that a collaboration pattern of the user does not match a collaboration pattern for the community observed during the predetermined time period.

Computing device 202 generally represents any type or form of computing device capable of reading computer-executable instructions. In some embodiments, computing device 202 may be one or more remote servers (i.e., cloud servers) configured to monitor and/or process file access. In another embodiment, computing device 202 may include one or more local servers. Additional examples of computing device 202 include, without limitation, laptops, tablets, desktops, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Shared data repository 208 generally represents any type or form of physical and/or virtual data storage. Files 210 generally represent any type of data stored on a computing device, including but not limited to document files, media files, application files, source files, binary files, and/or configuration files. Anomalous collaboration pattern 212 generally represents any type of record of access to files, shared access to files with other users, and/or collaboration with other users.

Figure 3:
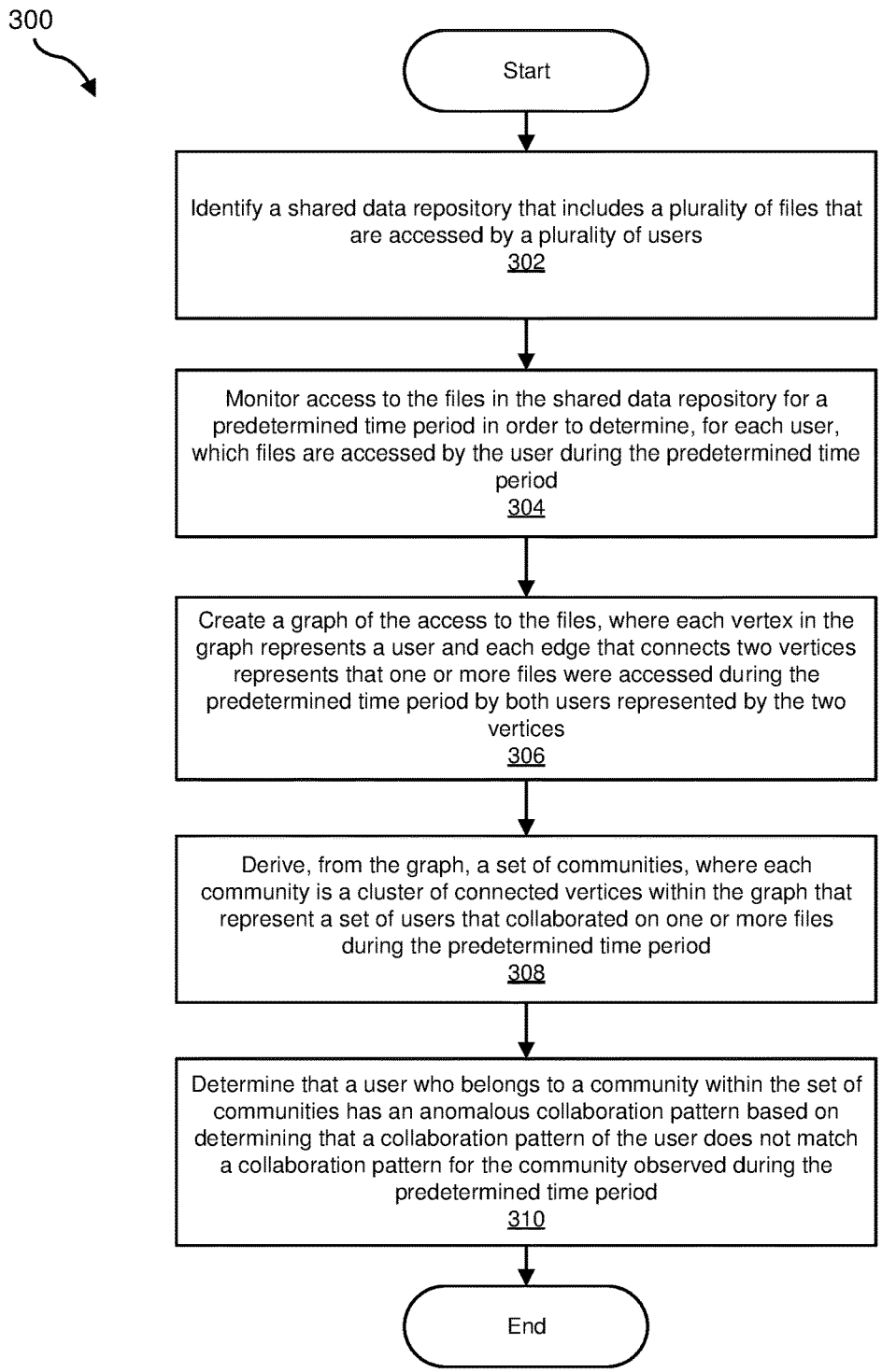
FIG. 3 is a flow diagram of an example method for detecting anomalous behavior in shared data repositories.

FIG. 3 is a flow diagram of an example computer-implemented method 300 for detecting anomalous behavior in shared data repositories. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302, one or more of the systems described herein may identify a shared data repository that may include a plurality of files that are accessed by a plurality of users. For example, identification module 104 may, as part of computing device 202 in FIG. 2, identify shared data repository 208 that may include a files 210 that are accessed by a plurality of users.

The term "shared data repository," as used herein, generally refers to any virtual and/or physical data storage location that is accessible by multiple users. In some embodiments, a shared data repository may include data managed by a version control system. In one embodiment, a shared data repository may be hosted on one or more remote servers (i.e., the cloud). Additionally or alternatively, a shared data repository may be hosted on a local server. In some embodiments, users may be required provide authentication credentials to a shared data repository in order to view, modify, add, and/or delete data. In some examples, a shared data repository may include a system that monitors and/or logs access and/or changes to data in the shared data repository. In some examples, a shared data repository may be accessible only to a defined set of users (e.g., users within an organization and/or users with accounts on an enterprise network). However, as will be discussed in greater detail below, in some examples a user with legitimate access to the shared data repository may illegitimately access data within the shared data repository (e.g., for illegitimate purposes, such as an attempt to violate a data loss prevention policy).

Identification module 104 may identify a shared data repository in a variety of ways and/or contexts. For example, identification module 104 may receive input from an administrator identifying a shared data repository. In another example, identification module 104 may scan a network, server, and/or other computing device and may automatically identify a shared data repository. In one embodiment, identification module 104 may be part of a security application that protects a shared data repository. In some embodiments, identification module 104 may identify a section of a shared data repository. For example, a shared data repository may include several sections that each store files for different departments within an organization. In this example, identification module 104 may identify a section of the shared data repository that stores files for the engineering department.

At step 304, one or more of the systems described herein may monitor access to the plurality of files in the shared data repository for a predetermined time period in order to determine, for each user within the plurality of users, which files within the plurality of files are accessed by the user during the predetermined time period. For example, monitoring module 106 may, as part of computing device 202 in FIG. 2, monitor access to files 210 in shared data repository 208 for a predetermined time period in order to determine, for each user within the plurality of users, which files within files 210 are accessed by the user during the predetermined time period.

The term "access," as used herein, generally refers to any type of interaction between a user and a file. In some examples, a user may access a file by viewing the file. In one example, a user may access a file by checking out, downloading, and/or copying the file. Additionally or alternatively, a user may access a file by opening the file, transferring the file, modifying the file, and/or deleting the file.

Monitoring module 106 may monitor access to files in a shared data repository in a variety of ways. In some examples, monitoring module 106 may monitor access logs created by a system that monitors and/or controls access to the files, such as a version control system. In some embodiments, monitoring module 106 may operate as part of a version control system. Additionally or alternatively, monitoring module 106 may monitor access to files by monitoring which files are opened, checked out, and/or downloaded by which users. In some embodiments, monitoring module 106 may monitor one or more applications for interacting with files stored in the shared data repository, such as document viewers and/or editors.

At step 306, one or more of the systems described herein may create a graph of the access to the plurality of files in the shared data repository, where each vertex in the graph represents a user within the plurality of users and each edge in the graph that connects two vertices represents that one or more files in the plurality of files were accessed during the predetermined time period by both users represented by the two vertices. For example, creation module 108 may, as part of computing device 202 in FIG. 2, create graph 122 of the access to files 210 in shared data repository 208, where each vertex in graph 122 (including, e.g., vertex 124) represents a user within the plurality of users and each edge in graph 122 that connects two vertices (including, e.g., edge 126) represents that one or more files in files 210 were accessed during the predetermined time period by both users represented by the two vertices.

The term "graph," as used herein, generally refers to any type of data structure that includes nodes and/or vertices that are connected on a pairwise basis by edges. Accordingly, the term "graph" may refer to a graph data structure and/or a data structure that is isomorphic to a graph data structure. In some embodiments, each vertex in the graph may represent a user who has accessed one or more files in the shared data repository and/or each edge may represent that both users represented by the vertices connected by the edge accessed one or more of the same files. In some examples, the graph may be an undirected graph with edges that do not indicate a direction of a relationship between the vertices connected by the edges. In some embodiments, the graph may be an unweighted graph where edges are not assigned a value. In other embodiments, the graph may be a weighted graph where edges are assigned a value. For example, the graph may include edges that are weighted by how many files were accessed in common the users represented by the vertices. In one example, an edge between two users that accessed only one file in common may have a weight of one while an edge between two users that accessed ten files in common may have a weight of ten.

Creation module 108 may create a graph in a variety of ways. For example, creation module 108 may create a vertex for each user who accessed at least one file in the shared data repository during the predetermined time period and may then create an edge between each pair of vertices that represents a pair of users who accessed at least one of the same files in the shared data repository during the predetermined time period.

Figure 4:
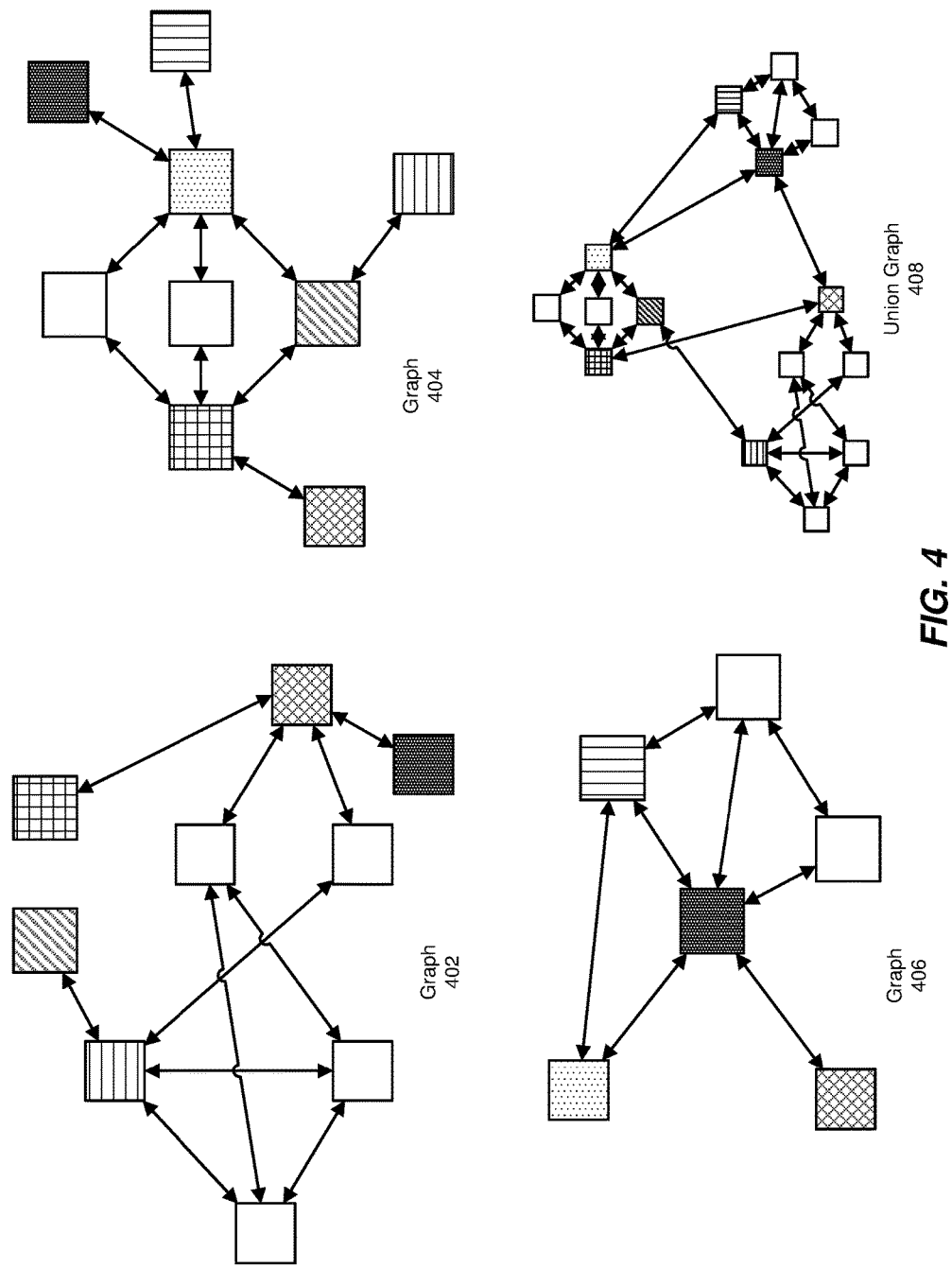
FIG. 4 is a block diagram of an example set of graphs.

In some embodiments, creation module 108 may create the graph of the access to the files in the shared data repository by determining a set of windows of time during the predetermined time period and, for each window of time in the set of windows of time, creating a subgraph of access to the plurality of files in the shared data repository during the window of time. In these embodiments, creation module 108 may then combine the subgraphs of access to the plurality of files in the shared data repository during each window of time into the graph of the access to the plurality of files in the shared data repository. For example, as illustrated in FIG. 4, creation module 108 may create a graph 402 based on access to files during a first window of time. Creation module 108 may also create a graph 404 based on access to files during a first window of time and/or a graph 406 based on access to files during a third window of time. In one example, graphs 402, 404, and/or 408 may represent access to files during the first, second, and/or third weeks of a month, respectively. In some examples, creation module 108 may combine graphs 402, 404, and/or 408 into a union graph 410 that may represent access to files in the shared data repository during a predetermined time period that spans the first, second, and third window of time. In one example, creation module 108 may combine graphs 402, 404, and/or 408 into union graph 410 by taking a union of graphs 402, 404, and/or 408.

In some embodiments, creation module 108 may continue to create graphs based on file access during windows of time until some characteristic of the graphs indicates that sufficient data has been collected for creation module 108 to create a meaningful union graph by combining the graphs. For example, creation module 108 may calculate the total number of vertices that a union graph would have if the union graph were to be created from the current set of graphs. In some embodiments, creation module 108 may have a predetermined threshold for total number of vertices in the union graph and may continue creating graphs for consecutive windows of time until the graphs include enough unique vertices to reach the predetermined threshold. Additionally or alternatively, creation module 108 may have a predetermined threshold for the density (i.e., the ratio of number of edges to number of vertices) in the union graph and may continue creating graphs until an analysis of the graphs estimates that the density of the resulting union graph would meet the predetermined threshold for density.

In some embodiments, creation module 108 may continue creating graphs representing file access during windows of time even after creating a union graph and/or may periodically create a new union graph from a new set of graphs. Additionally or alternatively, creation module 108 may periodically update the union graph with data from new graphs. In one embodiment, the systems described herein may continuously monitor access to files in the shared data repository during consecutive windows of time and creation module 108 may create a graph of each window of time and may then update the union graph with each newly created graph. For example, at the end of each week, creation module 108 may update the union graph by taking the union of the union graph and the graph representing file access during the past week. In some embodiments, creation module 108 may periodically recreate the union graph based on newly collected graphs of windows of time. For example, every two months, creation module 108 may create a union graph of the graphs collected during each week of the previous two months. In some examples, creation module 108 may create union graphs that overlap with previously created union graphs. For example, every month, creation module 108 may create a union graph of the graphs collected each week of the previous three months.

Returning to FIG. 3, at step 308, one or more of the systems described herein may derive, from the graph, a set of communities, where each community may include a cluster of connected vertices within the graph that represent a set of users that collaborated on one or more files within the plurality of files during the predetermined time period. For example, deriving module 110 may, as part of computing device 202 in FIG. 2, derive, from graph 122, set of communities 128, where each community may include a cluster of connected vertices within graph 122 that represent a set of users that collaborated on one or more files within files 210 during the predetermined time period.

The term "community," as used herein, generally refers to any set of users and/or representation of a set of users who routinely access files in common with one another during an observed time period. For example, a team working together on a project may appear on the graph as a cluster of connected nodes, which the systems described herein may designate as a community. In some embodiments, each user and/or vertex may belong to exactly one community. In other embodiments, each user and/or vertex may belong to at most one community. In one embodiment, a user and/or vertex may belong to multiple communities.

Deriving module 110 may derive the communities from the graph in a variety of ways. In some examples, deriving module 110 may use a graph-clustering technique to derive communities from the graph. Examples of graph-clustering techniques may include, without limitation, hierarchal clustering, the Girvan-Newman algorithm, and/or modularity maximization.

Figure 5:
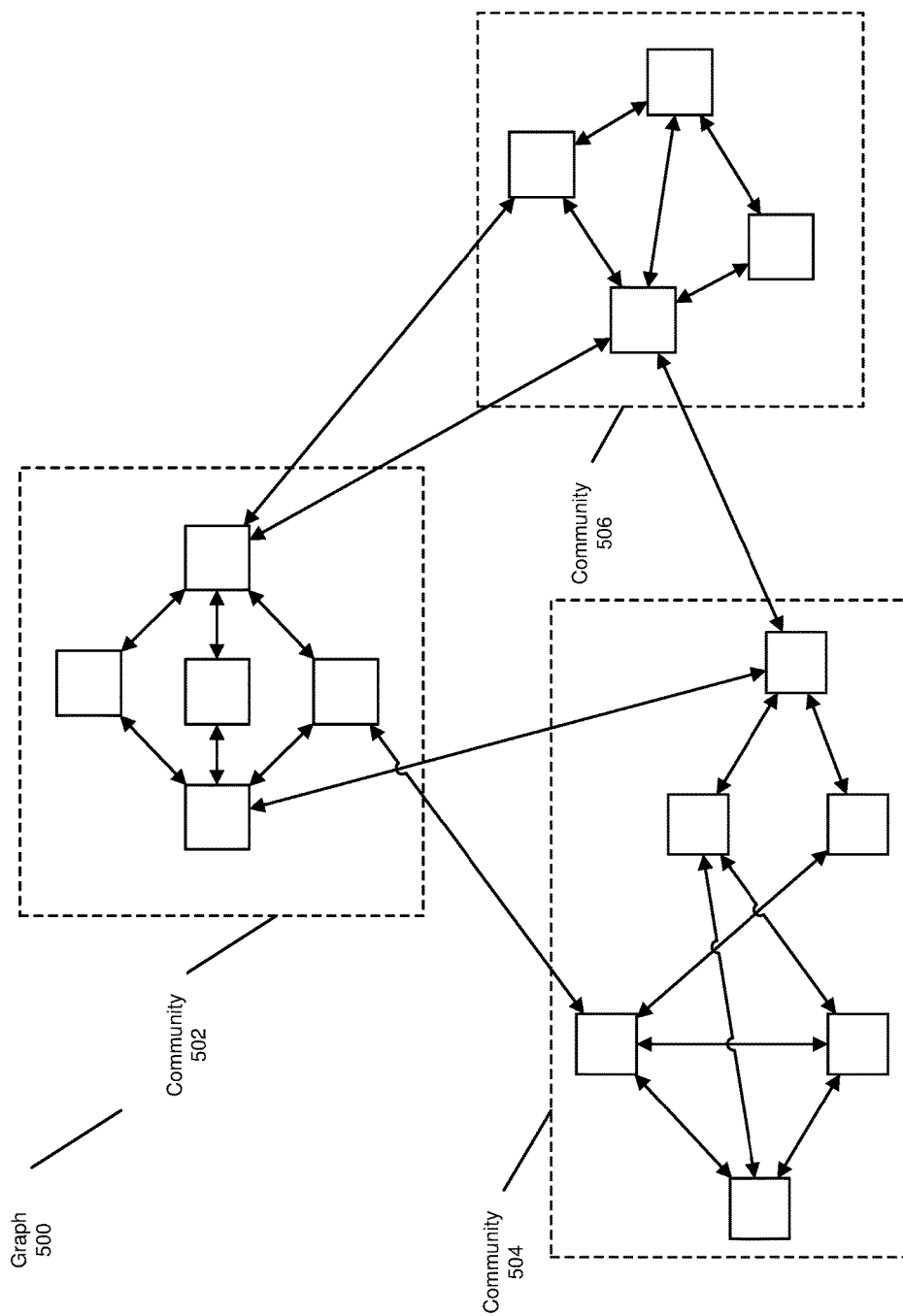
FIG. 5 is a block diagram of an example set of communities.

In some example, vertex user in a community may share an edge with each other vertex in the community. In other examples, some vertices in a community may not share an edge with each other vertex in the community. For example, as illustrated in FIG. 5, a graph 500 may include a community 502, a community 504, and/or a community 506. In this example, vertices may be connected to other vertices within the same community in a variety of configurations. In some examples, some vertices in a given community may be connected to vertices in other communities. In one example, every vertex within a graph may be part of exactly one community.

In some embodiments, the systems described herein may periodically update the graph and/or create an updated graph that represents file access during a new predetermined time period. In some embodiments, the updated graph may include a union of several graphs from different windows of time within the predetermined time period while in other embodiments the updated graph may be a graph created based on file access during one window of time that is not a union graph of multiple graphs created based on file access during windows of time. In some examples, deriving module 110 may determine that the set of communities derived from the graph no longer accurately represents the current state of the updated graph and/or may derive, from the updated graph, a new set of communities, where each new community includes a cluster of connected vertices within the updated graph that represent a set of users that collaborated on one or more files within the plurality of files during the new predetermined time period.

Deriving module 110 may determine whether the set of communities accurately represent the current state of the graph in a variety of ways. In some examples, deriving module 110 may compare the clustering coefficients of the graph and the updated graph and may determine that the set of communities no longer accurately represent the current state of the updated graph if the clustering coefficient of the graph differs from the clustering coefficient of the updated graph by more than a predetermined amount. In some embodiments, deriving module 110 may use a global clustering coefficient that is a measurement of the degree to which the vertices in the graph are clustered together in closely-connected groups that share a large number of edges.

Returning to FIG. 3, at step 310, one or more of the systems described herein may determine that a user who belongs to a community within the set of communities has an anomalous collaboration pattern based on determining that a collaboration pattern of the user does not match a collaboration pattern for the community observed during the predetermined time period. For example, determination module 112 may, as part of computing device 202 in FIG. 2, determine that a user who belongs to a community within set of communities 128 has anomalous collaboration pattern 212 based on determining that a collaboration pattern of the user does not match a collaboration pattern for the community observed during the predetermined time period.

The term "anomalous collaboration pattern," as used herein, generally refers to describe any pattern of common access to files with other users that is anomalous within a community to which a user belongs and/or anomalous compared to previous behavior of the user. In some examples, an anomalous collaboration pattern may be a suspicion collaboration pattern. In one example, an anomalous collaboration pattern may involve accessing files in common with a large number of users from a large number of different communities. In some examples, an anomalous collaboration pattern may indicate a user who is prospecting for valuable files to sell outside of the organization.

Determination module 112 may determine that a user has an anomalous collaboration pattern in a variety of ways and/or contexts. In some embodiments, determination module 112 may check each user represented in a graph for an anomalous collaboration pattern each time a graph is created and/or updated. In other embodiments, determination module 112 may check a subset of users for anomalous collaboration patterns in order to conserve computing resources. For example, determination module 112 may check a random subset of users, a subset of users who have accessed a large number of files, and/or a subset of users who have accessed files in common with a large number of other users.

In some embodiments, determination module 112 may determine that a user has an anomalous collaboration pattern by creating, from the graph, a subgraph of the collaboration pattern for the user and analyzing the subgraph of the collaboration pattern for the user. In one embodiment, a subgraph of the collaboration pattern for the user may include all edges between the vertex representing the user and other vertices as well as any edges between two vertices that are both connected to the user by an edge. In some examples, determination module 112 may compare features of the subgraph for the user to features of other users represented by vertices within the community to which the user belongs. Additionally or alternatively, determination module 112 may compare features of the subgraph for the user to features of a previous subgraph for the user.

In some examples, determination module 112 may determine that the user has the anomalous collaboration pattern by calculating a set of touched communities for the user in the graph, where each touched community within the set of touched community includes a vertex that shares an edge with a vertex that represents the user, calculating an additional set of touched communities for the user in a more recent graph, where the more recent graph represents access to the files during a new predetermined time period that is more recent than the predetermined time period, and dividing the cardinality of the intersection of the set of touched communities for the user in the graph and the additional set of touched communities for the user in the more recent graph by the cardinality of the union of the set of touched communities for the user in the graph and the additional set of touched communities for the user in the more recent graph. For example, determination module 112 may calculate the Jaccard Coefficient (JC) for the set of communities touched by the user in the graph compared to the set of communities touched by the user in the more recent graph. In some embodiments, determination module 112 may determine that any user with a JC below a certain threshold has an anomalous collaboration pattern. Additionally or alternatively, determination module 112 may determine that any user with a JC that varies by more than a predetermined amount from the average, mode, and/or median JC of other users within the same community has an anomalous collaboration pattern.

In some examples, determination module 112 may determine that the user who belongs to the community within the set of communities has the anomalous collaboration pattern by determining that the user has accessed at least one file in common with users who collectively belong to an anomalous amount of communities within the set of communities that do not include the community. Additionally or alternatively, determination module 112 may determine that a user does not have an anomalous collaboration pattern in comparison to the collaboration patterns of other users in the community to which the user belongs. For example, as illustrated in FIG. 6, the systems described herein may create subgraphs for two different users. In one example, a subgraph 622 for a user who is represented by a vertex 606 may include vertices 602, 604, 608, and/or 610. In this example, all of the aforementioned vertices may belong to community 630. In one example, the user represented by vertex 606 may have only touched community 630 in a previously created graph. In some embodiments, the previously created graph may be a previously created subgraph for the user while in other embodiments, the previously created graph may be the graph of access to files in the shared data repository. In this example, the union and the intersection of the sets of touched communities in the subgraph and the previously created graph may both contain only community 630. Thus, determination module 112 may calculate a JC of 1 to describe the similarity between the set of communities associated with the previously created graph for the user and the set of communities associated with subgraph 622 (e.g., describing recent activity by the user). In some embodiments, determination module 112 may determine that a user with a JC of 1 does not have an anomalous pattern of behavior.

In another example, a subgraph 624 may describe recent collaborations by a user represented by a vertex 616. Subgraph 624 may connect vertex 616 to vertices 612, 614, 618, and/or 620. In some examples, vertices 616, 618, and/or 620 may all belong to a community 634 (e.g., as previously determined by systems described herein) while vertex 612 may belong to a community 636 and/or vertex 614 may belong to a community 632. In one example, the user represented by vertex 616 may only have touched community 632 and/or community 634 in the previous graph. In this example, the union of the sets of touched communities from both graphs may include communities 632, 634, and/or 636, while the intersection of the sets of touched communities from both graphs may include communities 632 and/or 634, leading to a JC of ⅔. In one embodiment, determination module 112 may have a minimum threshold for JC of 0.75 and may determine that a JC of ⅔ represents an anomalous collaboration pattern.

In some examples, systems described herein may perform a security action involving the user in response to determining that the user has an anomalous collaboration pattern. For example, the systems described herein may alert an administrator about the user's anomalous collaboration pattern. In another example, the systems described herein may limit the user's access to sensitive files until an investigation of the user's activity is performed. In some examples, a user with an anomalous collaboration pattern may have a benign reason for the pattern. For example, the user may have switched projects and may now work on projects with a different group of collaborators. In some embodiments, the systems described herein may enable an administrator to flag a user in such circumstances as being expected to have an anomalous collaboration pattern.

In some embodiments, the systems described herein may operate on a network such as an enterprise network that includes multiple computing device operated by multiple users. For example, as illustrated in FIG. 7, one or more modules 102 may be hosted on a computing device 702 that communicates with computing device 706, 710, 712, and/or 714 via a network 704. In some examples, one or more of modules 102 may be hosted on computing device 706 and may monitor access by users of computing devices 710, 712 and/or 714 to a shared data repository 708 that may include instances of files 716 and/or 718. In some embodiments, computing device 706 may represent one or more cloud servers. In one example, a user operating computing device 714 may access files 716 and/or 718 and/or a user operating computing device 712 may access file 716. In this example, modules 102 on computing device 702 may create a graph 722 that includes an edge between the user operating computing device 714 and the user operating computing device 712 because both users accessed file 716. In some examples, modules 102 on computing device 702 may later analyze graph 722 to determine whether any users represented in the graph demonstrate anomalous file access behavior.

In some embodiments, the systems described herein may be part of a cloud security application such as SYMANTEC BLUE COAT, BARRACUDA CLOUD, and/or CIPHER-CLOUD. Additionally or alternatively, the systems described herein may be part of a local data management system.

As explained above in connection with method 300, the systems and methods described herein may identify anomalies in sharing patterns using community detection on collaboration graphs. In some examples, the systems and methods described herein may function as a generic anomaly detection solution that can be applied to streaming graph datasets. In some embodiments, the systems and methods herein may define desirable properties of union graph, such as number vertices and/or density, and calculate an optimal value for the number of graphs needed to create the union graph. In some embodiments, the systems and methods described herein may use well-proven community detection techniques to discover communities within a given union graph and/or may detect anomalous behavior in a given subgraph for a user with regards to communities detected on recently calculated union graph. Because recalculating communities on a graph may be computationally expensive, the systems and methods described herein may efficiently identify anomalous behavior by recalculating communities only when the previous set of calculated communities no longer accurately represents the current state of the graph. By efficiently detecting anomalous collaboration and/or file access patterns in this way, the systems and methods described herein may aid in insider threat detection by detecting individuals who are accessing files in order to illicitly collect data to sell to other organizations. The systems and methods described herein may enable organizations to enforce data loss prevention policies and/or secure data against individuals engaging in suspicious behavior, limiting the damage caused by malicious users who are attempting to copy and/or steal data.

Figure 8:
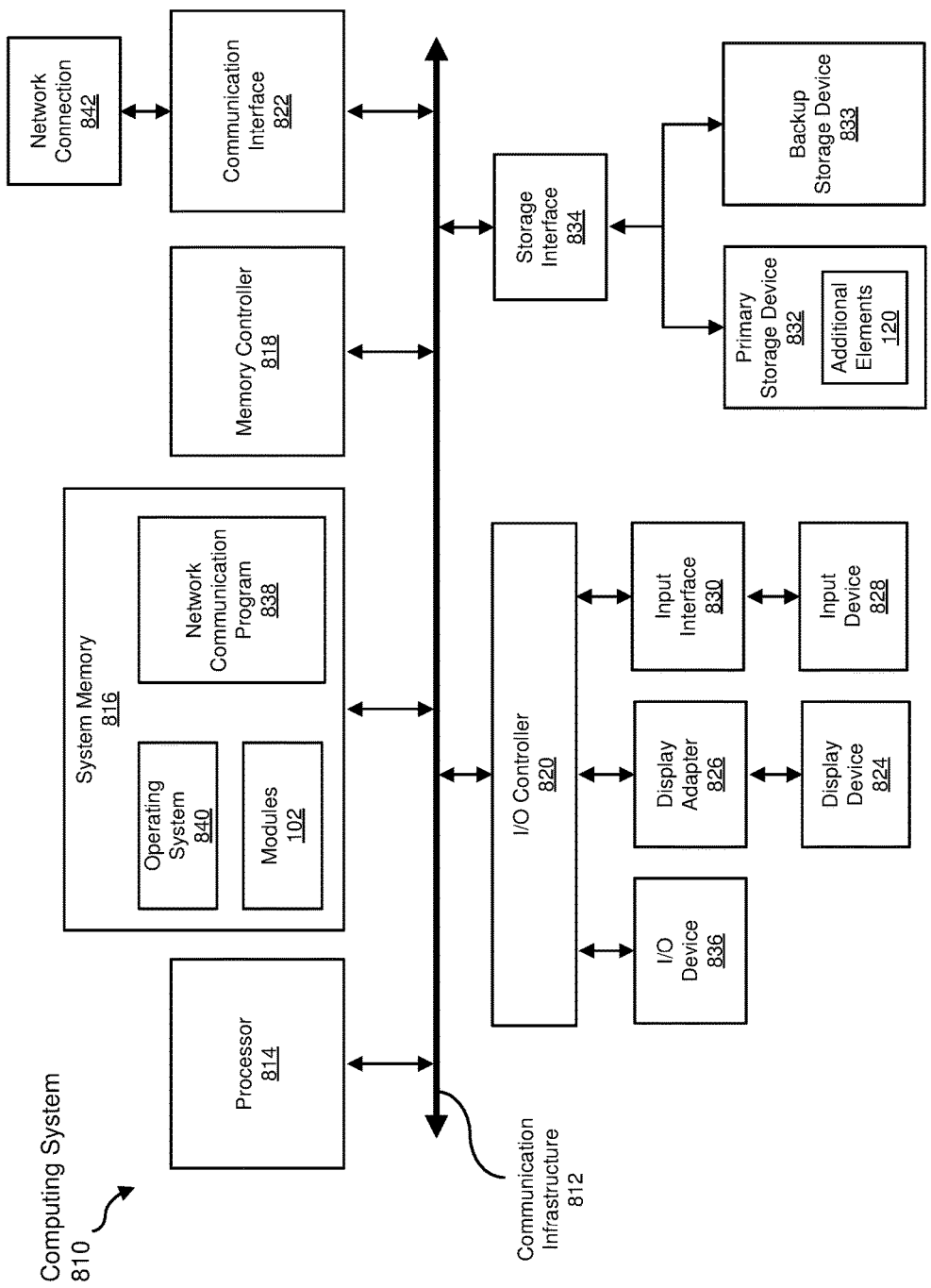
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 640 include, without limitation, LINUX, JUNOS, MICROSOFT WINDOWS, WINDOWS MOBILE, MAC OS, APPLE'S 10S, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, additional elements 120 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
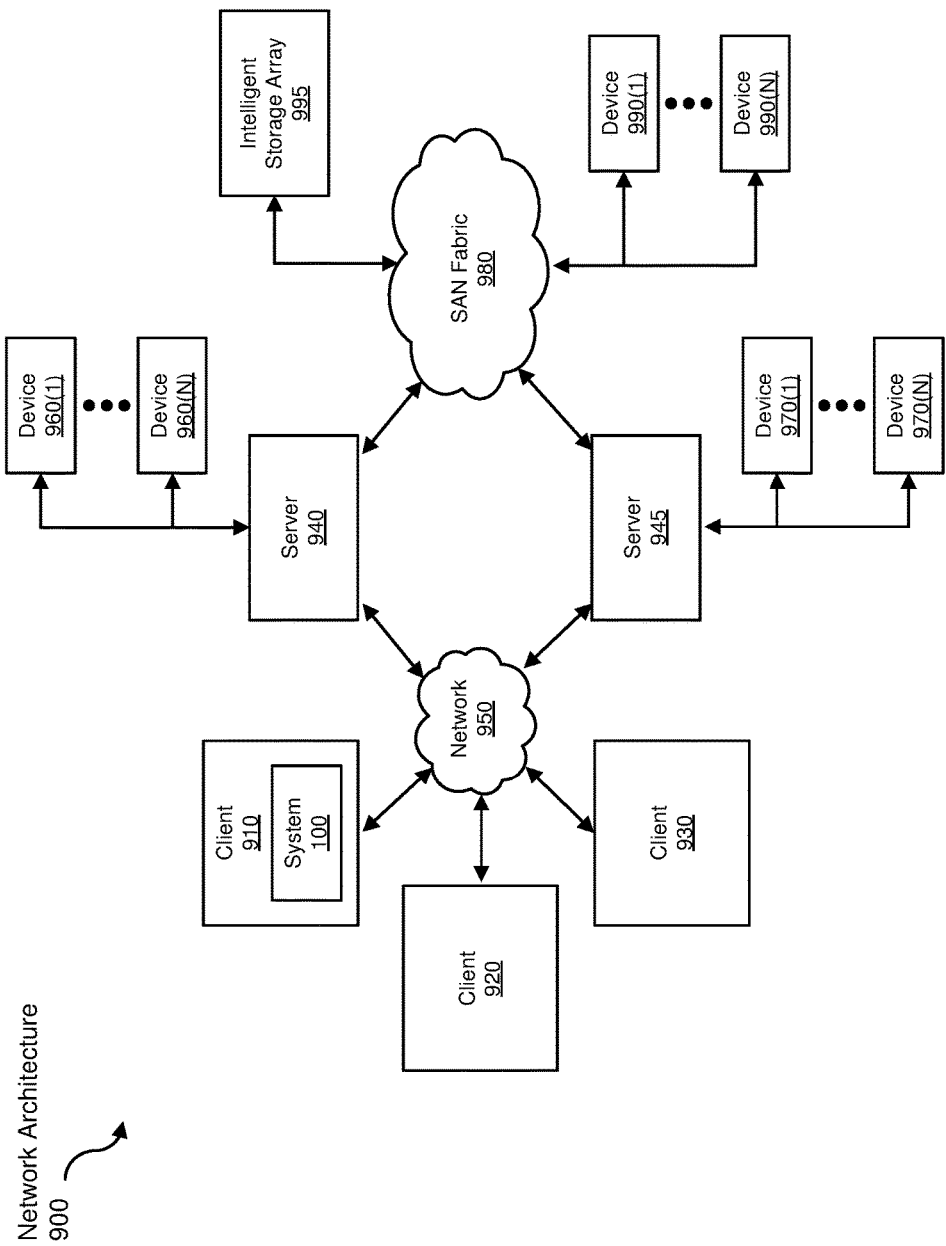
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the instant disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for detecting anomalous behavior in shared data repositories.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed.

The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive file access data to be transformed, transform the file access data into a graph, output a result of the transformation to one or more modules, use the result of the transformation to derive communities, and store the result of the transformation to memory. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting anomalous behavior in shared data repositories, at least a portion of the method being performed by a computing device comprising at least one processor, the method comprising:
   identifying a shared data repository that comprises a plurality of files that are accessed by a plurality of users;
   monitoring access to the plurality of files in the shared data repository for a predetermined time period in order to determine which files within the plurality of files are accessed by each user within the plurality of users during the predetermined time period;
   creating a graph of the access to the plurality of files in the shared data repository, the graph comprising vertices connected by edges, wherein each vertex in the graph represents a separate user within the plurality of users and each edge in the graph, that connects two vertices representing two users, represents that one or more files in the plurality of files were accessed during the predetermined time period by the two users;
   deriving, from the graph, a set of communities, wherein each community comprises a cluster of connected vertices within the graph that represent a set of users that collaborated on one or more files within the plurality of files during the predetermined time period;
   determining that a first user within the plurality of users who belongs to a community within the set of communities has an anomalous collaboration pattern based on determining that a collaboration pattern of the first user does not match a collaboration pattern for the community observed during the predetermined time period; and
   securing data within the shared data repository from access by the first user.

2. The computer-implemented method of claim 1, wherein determining that the first user who belongs to the community within the set of communities has the anomalous collaboration pattern comprises determining that the first user has accessed at least one file in common with users who collectively belong to an anomalous amount of communities within the set of communities, wherein the anomalous amount of communities within the set of communities do not comprise the community.

3. The computer-implemented method of claim 1, wherein determining that the first user who belongs to the community within the set of communities has the anomalous collaboration pattern comprises:
   calculating a set of touched communities for the first user in the graph, wherein each touched community within the set of touched community comprises a vertex that shares an edge with a vertex that represents the first user;
   calculating an additional set of touched communities for the first user in a more recent graph, wherein the more recent graph represents access to the plurality of files during a new predetermined time period that is more recent than the predetermined time period; and
   dividing the cardinality of the intersection of the set of touched communities for the first user in the graph and the additional set of touched communities for the first user in the more recent graph by the cardinality of the union of the set of touched communities for the first user in the graph and the additional set of touched communities for the first user in the more recent graph.

4. The computer-implemented method of claim 1, wherein determining that the first user who belongs to the community within the set of communities has the anomalous collaboration pattern comprises:
   creating, from the graph, a subgraph of the collaboration pattern for the first user; and
   analyzing the subgraph of the collaboration pattern for the first user.

5. The computer-implemented method of claim 1, further comprising:
   monitoring access to the plurality of files in the shared data repository for a new predetermined time period that begins after the predetermined time period began; and updating the graph of the access to the plurality of files in the shared data repository to reflect file access performed by each user within the plurality of users during the new predetermined time period.

6. The computer-implemented method of claim 5, further comprising:
determining that the set of communities derived from the graph no longer accurately represents a current state of the updated graph; and
deriving, from the updated graph, a new set of communities, wherein each new community comprises a cluster of connected vertices within the updated graph that represent a set of users that collaborated on one or more files within the plurality of files during the new predetermined time period.

7. The computer-implemented method of claim 1, wherein creating the graph of the access to the plurality of files in the shared data repository comprises:
determining a set of windows of time during the predetermined time period;
for each window of time in the set of windows of time, creating a subgraph of access to the plurality of files in the shared data repository during the window of time; and
combining the subgraphs of access to the plurality of files in the shared data repository during each window of time into the graph of the access to the plurality of files in the shared data repository.

8. The computer-implemented method of claim 7, wherein combining the subgraphs of access to the plurality of files in the shared data repository during each window of time into the graph comprises determining that the subgraphs comprise sufficient file access data to meet a predetermined threshold for file access data required to create a graph of the access to the plurality of files in the shared data repository.

9. A system for detecting anomalous behavior in shared data repositories, the system comprising:
an identification module, stored in memory, that identifies a shared data repository that comprises a plurality of files that are accessed by a plurality of users;
a monitoring module, stored in memory, that monitors access to the plurality of files in the shared data repository for a predetermined time period in order to determine which files within the plurality of files are accessed by each user within the plurality of users during the predetermined time period;
a creation module, stored in memory, that creates a graph of the access to the plurality of files in the shared data repository, the graph comprising vertices connected by edges, wherein each vertex in the graph represents a separate user within the plurality of users and each edge in the graph, that connects two vertices representing two users, represents that one or more files in the plurality of files were accessed during the predetermined time period by the two users;
a deriving module, stored in memory, that derives, from the graph, a set of communities, wherein each community comprises a cluster of connected vertices within the graph that represent a set of users that collaborated on one or more files within the plurality of files during the predetermined time period;
a determination module, stored in memory, that determines that a first user within the plurality of users who belongs to a community within the set of communities has an anomalous collaboration pattern based on determining that a collaboration pattern of the first user does not match a collaboration pattern for the community observed during the predetermined time period and secures data within the shared data repository from access by the first user; and
at least one physical processor configured to execute the identification module, the monitoring module, the creation module, the deriving module, and the determination module.

10. The system of claim 9, wherein the determination module determines that the first user who belongs to the community within the set of communities has the anomalous collaboration pattern by determining that the first user has accessed at least one file in common with users who collectively belong to an anomalous amount of communities within the set of communities, wherein the anomalous amount of communities within the set of communities do not comprise the community.

11. The system of claim 9, wherein the determination module determines that the first user who belongs to the community within the set of communities has the anomalous collaboration pattern comprises:
calculating a set of touched communities for the first user in the graph, wherein each touched community within the set of touched community comprises a vertex that shares an edge with a vertex that represents the first user;
calculating an additional set of touched communities for the first user in a more recent graph, wherein the more recent graph represents access to the plurality of files during a new predetermined time period that is more recent than the predetermined time period; and
dividing the cardinality of the intersection of the set of touched communities for the first user in the graph and the additional set of touched communities for the first user in the more recent graph by the cardinality of the union of the set of touched communities for the first user in the graph and the additional set of touched communities for the first user in the more recent graph.

12. The system of claim 9, wherein the determination module determines that the first user who belongs to the community within the set of communities has the anomalous collaboration pattern comprises:
creating, from the graph, a subgraph of the collaboration pattern for the first user; and
analyzing the subgraph of the collaboration pattern for the first user.

13. The system of claim 9, wherein:
the monitoring module monitors access to the plurality of files in the shared data repository for a new predetermined time period that begins after the predetermined time period began; and
the creation module updates the graph of the access to the plurality of files in the shared data repository to reflect file access performed by each user within the plurality of users during the new predetermined time period.

14. The system of claim 13 wherein the deriving module:
determines that the set of communities derived from the graph no longer accurately represents a current state of the updated graph; and
derives, from the updated graph, a new set of communities, wherein each new community comprises a cluster of connected vertices within the updated graph that represent a set of users that collaborated on one or more files within the plurality of files during the new predetermined time period.

15. The system of claim 9, wherein the creation module creates the graph of the access to the plurality of files in the shared data repository by:

determining a set of windows of time during the predetermined time period;

for each window of time in the set of windows of time, creating a subgraph of access to the plurality of files in the shared data repository during the window of time; and combining the subgraphs of access to the plurality of files in the shared data repository during each window of time into the graph of the access to the plurality of files in the shared data repository.

16. The system of claim 15, wherein the creation module combines the subgraphs of access to the plurality of files in the shared data repository during each window of time into the graph by determining that the subgraphs comprise sufficient file access data to meet a predetermined threshold for file access data required to create a graph of the access to the plurality of files in the shared data repository.

17. A non-transitory computer-readable medium comprising one or more computer-readable instructions that, when executed by at least one processor of a computing device, cause the computing device to:

identify a shared data repository that comprises a plurality of files that are accessed by a plurality of users;

monitor access to the plurality of files in the shared data repository for a predetermined time period in order to determine which files within the plurality of files are accessed by each user within the plurality of users during the predetermined time period;

create a graph of the access to the plurality of files in the shared data repository, the graph comprising vertices connected by edges, wherein each vertex in the graph represents a separate user within the plurality of users and each edge in the graph, that connects two vertices representing two users, represents that one or more files in the plurality of files were accessed during the predetermined time period by the two users;

derive, from the graph, a set of communities, wherein each community comprises a cluster of connected vertices within the graph that represent a set of users that collaborated on one or more files within the plurality of files during the predetermined time period;

determine that a first user within the plurality of users who belongs to a community within the set of communities has an anomalous collaboration pattern based on determining that a collaboration pattern of the first user does not match a collaboration pattern for the community observed during the predetermined time period; and secure data within the shared data repository from access by the first user.

\* \* \* \* \*